United States Patent
Dobre et al.

(10) Patent No.: US 9,996,552 B2
(45) Date of Patent: Jun. 12, 2018

(54) METHOD FOR GENERATING A DATASET STRUCTURE FOR LOCATION-BASED SERVICES AND METHOD AND SYSTEM FOR PROVIDING LOCATION-BASED SERVICES TO A MOBILE DEVICE

(71) Applicant: NEC EUROPE LTD., Heidelberg (DE)

(72) Inventors: Dan Dobre, Munich (DE); Nuno Filipe Vieira Dos Santos, Berlin (DE)

(73) Assignee: NEC Corporation, Tokyo (JP)

( * ) Notice: Subject to any disclaimer, the term of this patent is extended or adjusted under 35 U.S.C. 154(b) by 302 days.

(21) Appl. No.: 14/423,158

(22) PCT Filed: Apr. 9, 2013

(86) PCT No.: PCT/EP2013/057403
§ 371 (c)(1),
(2) Date: Feb. 23, 2015

(87) PCT Pub. No.: WO2014/166527
PCT Pub. Date: Oct. 16, 2014

(65) Prior Publication Data
US 2015/0227553 A1 Aug. 13, 2015

(51) Int. Cl.
*G06F 7/00* (2006.01)
*G06F 17/30* (2006.01)
*H04W 4/02* (2018.01)
*H04L 29/08* (2006.01)

(52) U.S. Cl.
CPC .... *G06F 17/30241* (2013.01); *G06F 17/3033* (2013.01); *H04W 4/021* (2013.01); *H04L 67/10* (2013.01)

(58) Field of Classification Search
CPC .......... G06F 17/30241; G06F 17/3033; H04W 4/021; H04W 4/02; H04L 67/10
See application file for complete search history.

(56) References Cited

U.S. PATENT DOCUMENTS

| | | | |
|---|---|---|---|
| 7,010,308 B2 * | 3/2006 | Hendrey | H04W 64/00 455/433 |
| 7,848,765 B2 * | 12/2010 | Phillips | G08B 21/0236 455/404.2 |
| 8,031,114 B2 * | 10/2011 | Kellermeier | B60R 25/102 342/357.64 |

(Continued)

*Primary Examiner* — Daniel Kuddus
(74) *Attorney, Agent, or Firm* — Leydig, Voit & Mayer, Ltd.

(57) ABSTRACT

A method for generating a dataset structure for location-based services includes partitioning a geographical area, including areas of interest, into tiles. The tiles are associated with servers, wherein each of the tiles is associated with at least one server based on a consistent hashing function. For each of the tiles, a first dataset is generated which includes the areas of interest intersecting the tile. The areas of interest of the first dataset are trimmed by edges of the tile or completely contained in the tile. For each of the tiles, a second dataset is generated which includes overflowed parts. Each of the overflowed parts is part of an areas of interest of the first dataset, is trimmed by an edge of the tile and is located outside of the tile. For each of the tiles, the first and second datasets are stored at the server(s) associated to the tile.

20 Claims, 4 Drawing Sheets

(56) References Cited

U.S. PATENT DOCUMENTS

| | | | | |
|---|---|---|---|---|
| 2002/0151315 A1* | 10/2002 | Hendrey | ............... | H04W 64/00 455/466 |
| 2005/0270299 A1* | 12/2005 | Rasmussen | ............ | G01C 21/32 345/552 |
| 2006/0270421 A1* | 11/2006 | Phillips | .............. | G08B 21/0236 455/457 |
| 2009/0047979 A1* | 2/2009 | Oh | .......................... | G01S 19/05 455/457 |
| 2009/0243925 A1* | 10/2009 | Kellermeier | .......... | B60R 25/102 342/357.64 |
| 2009/0299990 A1* | 12/2009 | Setlur | ............... | G06F 17/30265 |
| 2011/0164581 A1* | 7/2011 | Keon | .................... | H04W 16/14 370/329 |
| 2011/0262048 A1* | 10/2011 | Barnsley | ............. | H04N 19/132 382/233 |
| 2012/0041675 A1* | 2/2012 | Juliver | ................... | G06Q 10/08 701/465 |
| 2013/0018826 A1* | 1/2013 | Sundararajan | ...... | H04L 12/6418 706/12 |
| 2013/0045753 A1* | 2/2013 | Obermeyer | ........ | G08B 21/0277 455/456.1 |
| 2013/0103648 A1* | 4/2013 | Sample | ................ | G09B 29/003 707/661 |
| 2013/0138334 A1* | 5/2013 | Meredith | ............. | H04W 4/022 701/408 |
| 2013/0317944 A1* | 11/2013 | Huang | ................. | G01S 5/0252 705/26.61 |

* cited by examiner

Fig. 1
State of the Art

METHOD FOR GENERATING A DATASET STRUCTURE FOR LOCATION-BASED SERVICES AND METHOD AND SYSTEM FOR PROVIDING LOCATION-BASED SERVICES TO A MOBILE DEVICE

CROSS-REFERENCE TO PRIOR APPLICATIONS

This application is a U.S. National Phase application under 35 U.S.C. § 371 of International Application No. PCT/EP2013/057403, filed on Apr. 9, 2013. The International Application was published in English on Oct. 16, 2014 as WO 2014/66527 under PCT Article 21(2).

FIELD

A first aspect of the present invention relates to a method for generating a dataset structure for location-based services. A second aspect of the present invention relates to a method and a system for providing location-based services to a mobile device within a geographical area using the dataset structure generated by a method according the first aspect of the invention.

BACKGROUND

In an increasingly mobile world, a huge amount of information derived from mobile devices is available for application developers to take advantage of. However, access to raw data is rarely sufficient and may prove too cumbersome. Particularly at location-based services (LBS), processing of raw location data may be complex and extensive so that it should not be performed by mobile devices with restricted resources. Usually application developers rely on frameworks that provide some kind of pre-processing on the data, enabling higher-level abstractions and richer applications.

Geofencing is one such higher-level abstraction. The Geofencing problem consists in, given two consecutive location updates previous location (PL) and current location (CL), determining a set of areas (or geofences) of interest exited between the two locations, as well as a set of areas of interest entered, with the intention of generating an action regarding these entered and exited areas.

Figure 1:
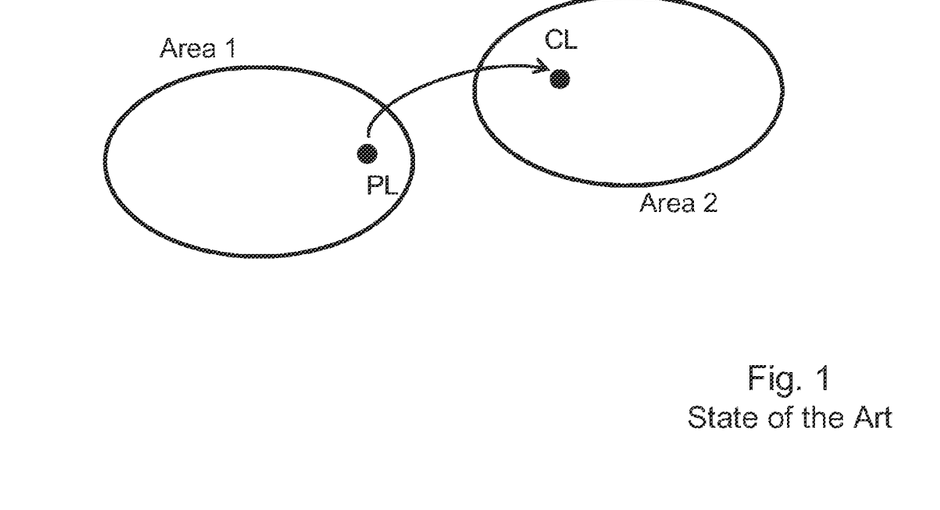
FIG. 1 shows a schematic diagram with an example of location updates at a Geofencing system.

FIG. 1 illustrates the basic concept of the Geofencing problem. At a first location update, a mobile device is located at a previous location PL within Area1. At a second location update performed after the first location update, the mobile device is located at a current location CL within Area2. This means that the mobile device has moved from PL to CL and from Area1 to Area2. A Geofencing system would trigger Area1 as being exited and Area2 as being entered.

A straightforward algorithm for calculating exited and entered geofences is to first get the set of geofences inside which the previous location PL is contained in (set Previous) and the set of geofences inside which the current location CL is contained in (set Current). The sets Exited and Entered (referring to exited and entered geofences) can be determined as follows:

Entered=Current−Previous:={x∈Current|x∉Previous}

Exited=Previous−Current:={x∈Previous|x∉Current}

This means that set Entered contains each geofences of the set Current which is not contained in the set Previous.

With the explosion of Location-Based Services which make use of geo-tagged data, as well as the ever-increasing number of mobile devices which enable these services, strategies need to be employed to handle the large amounts of data involved. Additionally, responses to a large number of queries have to be generated. Current state-of-the-art in geo-tagged data indexing employ some kind of partitioning mechanism to better distribute data and balance load.

One approach is disclosed by Jinbao Wang et al. "Indexing multidimensional data in a cloud system" (SIGMOD 10, 2010) which uses a RT-CAN (R-Tree based index in CAN) based approach. The global index is disseminated to different cluster servers which are organized as a logical CAN (Content Addressable Network) based overlay network. Several algorithms (one of them dynamic) are used to optimize the system, thus reducing query and index maintenance costs.

In a Geofencing system, when different areas are partitioned across different servers the algorithm requires that all servers calculate the sets Current and Previous, and then operate on both these sets to calculate entered and exited areas respectively (as detailed in the previous two formulas). This means either the two sets are forwarded by the different servers to a third server, responsible for subtracting the sets, or the sets are themselves exchanged between the two servers which then do the subtraction. This results in high latency and a large number of messages to be exchanged between the servers.

LBSs is a very hot topic at the present, naturally exploiting the nature of an increasingly "connected" world, where all kinds of mobile devices are present. U.S. Pat. No. 7,848,765 B2 discloses a variety of methods and systems relating to LBSs. However, its content does not provide any help regarding reduction of latency or of the number of exchanged messages.

SUMMARY

In an embodiment, the present invention provides a method for generating a dataset structure for location-based services. A geographical area, including a plurality of areas of interest, is partitioned into a plurality of tiles. The tiles are associated with a plurality of servers, wherein each of the tiles is associated with at least one of the servers based on a consistent hashing function. For each of the tiles, a first dataset of the dataset structure is generated which includes the areas of interest intersecting the tile. The areas of interest of the first dataset are trimmed by edges of the tile or completely contained in the tile. For each of the tiles, a second dataset of the dataset structure is generated which includes overflowed parts. Each of the overflowed parts is part of one of the areas of interest of the first dataset, is trimmed by an edge of the tile and is located outside of the tile. For each of the tiles, the first and second datasets are stored at the at least one of the servers associated to the tile.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Thus, the present invention recognizes it would be advantageous to provide a method for generating a dataset structure which may be used for location-based services and which allows for distributed computation regarding areas of interest while reducing the necessity of exchanging messages and reducing latency. Additionally a method and a system for providing location-based services to a mobile device using this dataset structure should be provided In an embodiment, the present invention provides a method comprising:

partitioning a geographical area into a plurality of preferably equal-sized tiles, wherein said geographical area comprises a plurality of areas of interest, associating said tiles with multiple servers, wherein each tile is associated with at least one of said server according to a consistent hashing function, generating, for each tile, a first dataset which comprises areas of interest intersecting said tile, wherein the areas of interest of said first dataset are trimmed by edges of said tile or completely contained in said tile, generating, for each tile, a second dataset which comprises overflowed parts, wherein each of said overflowed parts is part of an area of interest of a first dataset, is trimmed by an edge of said tile and is located outside of said tile, and storing, for each tile, said first and second datasets at the servers associated to said tile.

In an embodiment, the present invention also provides a method for providing location-based services, comprising:

receiving location information of said mobile client, wherein said location information comprises a previous location and a current location of said mobile client determined at two consecutive location update, determining a current tile, wherein said current tile is one of said plurality of tiles and contains said current location, determining a current server associated with said current tile according to a consistent hashing function, wherein said current server is one of multiple servers, accessing, at said current server, first and second datasets of said dataset structure, determining, by said current server, a current set of area of interest, wherein said current set comprises each area of interest of said first dataset in which said current location is contained in, and determining location changes using said current set and said previous location.

In an embodiment, the present invention further provides a system for providing location-based services, comprising:

multiple servers, wherein each of said servers is associated with at least one tile of said plurality of tiles according to a consistent hashing function, means for receiving location information of said mobile client, wherein said location information comprises a previous location and a current location of said mobile client determined at two consecutive location update, means for determining a current tile, wherein said current tile is one of said plurality of tiles and contains said current location, means for determining a server associated with said current tile using said consistent hashing function, and means for calculating location changes of said client using said previous location and said current location based on said first and second datasets.

According to an embodiment of the invention, it has been recognized that pre-processing and distributing data regarding areas of interest in a particular way can be supported. According to an embodiment of the invention, in a first step, a grid is generated which partitions the geographical area into a plurality of tiles. This creates a structured basis for further steps. Preferably, the single elements of the grid (hereinafter referred to as tiles) are equal-sized. The grid is substantially independent to the areas of interest, i.e. position and orientation of the tiles are not dependent on the areas of interest contained in the geographical area. Size, position and orientation of the tiles are not adjusted during normal operation. They are configuration parameters which can be adjusted beforehand and which may take the areas of interest into account. However, this is not a necessary constraint. In many cases, a dependency between the grid and the areas of interest is even hard to fulfill, particularly if equal-sized tiles and generally arbitrarily shaped areas of interest are used.

In a next step, the single tiles of the grid are associated with multiple servers which will be used to determine location changes of a mobile client. Association of tiles is performed using a consistent hashing function: Each tile is associated with at least one of the multiple servers. A tile will be associated with just one server, if no replicas are provided. A tile may be associated with two or more servers according to the number of desired replicas. Preferably, several tiles are associated with one server. However, it might also be possible that each server is associated with just one tile.

The consistent hashing function provides a unique link between a tile and a server. The link may associate a tile to a server in a rather random way. However, the link is unique and leads to the same result at each access. This enables direct access to the associated server without hopping from server to server to find the correct one.

In a third step, the areas of interest are distributed to the single servers, thus generating a particular dataset structure. The dataset structure comprises first and second datasets. Each first dataset comprises areas of interest intersecting a tile. Each second dataset comprises overflowed parts.

As the tiles do not have a direct link to areas of interest and as the partitioning step does not consider the areas of interest, most of the areas of interest will not fall within a single tile. Therefore, parts of many areas of interest are contained in two or even more tiles. If several tiles intersect an area of interest, a tile which contains a part of an area of interest has at least one neighboring tile which also contains a part of this area of interest. This distribution of an area of interest to several tiles is used at generation of the first and second datasets.

The step of generating first and second datasets is performed for each tile T of the plurality of tiles. At a tile T, each area of interest is determined which intersects tile T, i.e. each part of an area of interest which falls into the tile T is considered as intersecting. Each area of interest which intersects tile T is added the first dataset generated for tile T. The areas of interest contained in the first dataset may be contained completely in tile T or may be trimmed by one or more edges of tile T. If an area of interest is trimmed by one or more edges, there are parts of the area of interest which are contained in tiles which are adjacent to tile T. These parts of the areas of interest are referred to as "overflowed parts". Each of the overflowed part is added to the second dataset generated for tile T. Therefore, the first dataset contains each area of interest intersecting tile T, the second dataset contains each part of the area of interest of the first dataset which is trimmed by an edge of tile T and which is contained outside tile T. After the generating steps for each tile T of the plurality of tiles, each area of interest of the geographical area is contained in at least one first dataset and most likely in one or more second datasets.

The first and second datasets are stored at the server which is associated to a particular tile so that the server can access the first and second datasets during operation, i.e. at participating in a system for providing a location-based service. It should be understood that it is not necessary to store the datasets on the hard disk of the servers. It is also possible that the datasets are stored at a data storage which can be accessed by the servers. However, the datasets are preferably stored in a distributed way in order to avoid hotspots or single point of failure.

Although the overall amount of data, which is stored on (or for) the servers, is increased, this dataset structure is particular helpful when location changes of a mobile client has to be determined. As a server associated to a tile is aware of the complete area of interest (not just a part of it), the server can determine, whether a mobile client entered or exited a region of interest when moving from a previous location to a current location. This can be performed without communication with another server. Thus the described dataset structure reduces the necessity of exchanging messages between the servers. As computations can be performed by a single server, latency of the complete system can be reduced. Due to the usage of tiles which are substantially independent to the areas of interest and due to the consistent hashing function, the tile and the server associated to this tile can be determined based on the position of a mobile device without searching a tree or other data structures. This reduces latency and the number of exchanged messages even further.

A method or a system providing location-based services according to an embodiment of the invention may use this dataset structure. In a first step, location information, which reflects the position of a mobile device at two consecutive location updates, are received by according means. The term "two consecutive location updates" refers to a first location update and a second location update after the first location update. There is no direct constraint regarding the time interval between the first and second location updates. The time interval is generally defined by the location-based service. However, the interval will be generally smaller than 10 minutes, preferable smaller than 1 minute. The location information comprises a previous location (PL) determined at the first location update and a current location (CL) determined at the second location update.

In a second step a current tile is determined, i.e. the tile of the plurality of tiles which contains the current location (CL). This step may be performed by various entities. According to one possible embodiment, the mobile client determines the current tile based on its current location using geographical information of the tiles which is accessible by or stored at the mobile client. According to another embodiment, the current tile may be determined by a server or several servers which may access information linking location information with the partitioning scheme.

After determining the current tile, the current server which is associated with the current tile is determined. As each tile is associated to at least one server by a consistent hashing function, the current server can be determined easily. This is also true, if a tile is associated to two or more servers. As the system does not depend on the server which performs calculations but on the tile which refers to the current or the previous location, it does not matter which server performs calculations. Therefore, a request for calculating location changes may be handled by each of the servers associated with a particular tile.

In a next step, the current server accesses the first and second datasets. In a preferred embodiment these datasets are stored at a memory of the current server (for instance a hard disc). However, the first and second datasets may also be stored at a remote data store which is accessed by the current server via a local area network or the like.

In another step, the current server determines a current set which comprises each area of interest in which the current location is contained in. As the first dataset contains each area of interest which intersects the current tile and as the current tile contains the current location, this current set may be determined using the first dataset. In another step, location changes are determined using the current set and the previous location.

In an embodiment of the present invention, the location-based service is provided by a Geofencing system. In this case, the areas of interest are geofences. The present invention is not limited to these systems. The steps and entities described in this document may also be used at other location based systems.

According to a particular simple implementation of the partitioning scheme, the tiles have quadratic or rectangular shape. This implementation reduces complexity of determining, whether a location is contained within a tile or not. However, also other shapes of tiles may be used in connection with the present invention. Examples are hexagonal, octagonal or other polygonal shapes. As the grid should cover the complete geographical area, the tiles should have such a shape that the tiles can be directly placed beside each other without leaving space between the tiles.

In order to avoid hotspots among the servers, the consistent hashing function may employ a load balancing scheme. Preferably, the tiles are distributed evenly over the servers.

Preferably the consistent hashing function employs a load balancing scheme. This may be established by using a hashing function which provides values that are uniformly (or at least substantially uniformly) distributes among the hash range. For such hashing functions, association of servers with tiles is rather random so that a good load balancing scheme may be provided.

One preferred embodiment of the consistent hashing function uses the method String.hashCode( ) provided by programming language java. In a first step identifier (IDs) may be assigned to each of the plurality of tiles. Preferably, the tiles are numbered. In a second step, a hash may be determined, preferably using the following function:

$$h(s) = \sum_{i=0}^{n-1} s[i] \cdot 31^{n-1-i}$$

where s is the string representing the ID of the tile and n in the length of the string. This hash h(s) is an unsigned 32 bits Integer, so the hashing space has a total range of [−(2^31), 2^31−1]. Each server then may get an equal share of the range. In this preferred embodiment, the hashing function results are random, and every server has an equal proportion of the entire hashing range. This provides a good load balancing scheme.

For introducing redundancy, several hashing functions may be employed, where each hashing function provides a consistent hashing algorithm. The hashing functions may be configured such that a tile is associated with another server by each of the several hashing functions. If for instance R hashing functions are provided, each tile will be associated to R different servers. If a request regarding a current tile is received, one of the hashing functions may be selected in order to determine the server which performs the further steps of the method. This selection process may also employ a load balancing scheme so that the requests are equally distributed to the servers.

When a new area of interest is inserted to the geographical area, the dataset structure has to be updated so that the new area of interest may be considered at future calculations. The step of inserting a new area of interest may comprise a first step of determining each tile of the plurality of tiles which intersect the new area of interest. In a second step, the new area of interest may be mapped to the determined tiles. In a third step, the new area of interest may be added to the first and second dataset of each determined tiles at the associated servers. This third step is similar to the steps which are performed at the initial setup of the dataset structure and which are described before. If several consistent hashing functions are employed, the first and second datasets should be stored at or for each of the servers which are associated with one of the determined tiles.

The step of removing an old area of interest may be similar: In a first step, the tiles intersecting this old area of interest may be determined. In a second step, the server/s, which is/are associated with the determined tiles, may be determined. In a third step, the old area of interest may be removed from the first and second dataset of each determined server.

At the method for providing location-based services according to an embodiment of the invention, the step of determining location changes may include the step of determining a set Entered. This set Entered contains each area of interest which is entered by the mobile device when moving from the previous location PL to the current location CL. One possibility of determining the set Entered comprises: adding an area of interest of the current set to the set Entered, if the previous location is not contained in an area of interest of the first or second dataset at the current server. In other words: Each area of interest of the current set is examined, i.e. each area of interest in which the current location is contained in. If the previous location falls into one area of interest of the current set, this area of interest is not entered. If the previous location is not contained in an area of interest of the current set, this area of interest is entered. Due to the special structure of the first and second datasets, this can be determined without interaction with another server. Each area of interest of the current set is checked, whether it contains the previous location either in the first dataset or in the second dataset.

Additionally or alternatively the step of determining location changes may include the step of determining a set Exited. This set Exited contains each area of interest which is exited by a mobile device when moving from the previous location to the current location.

According to a first option, the previous location falls on the current tile. In this case, the set Exited can be determined by the current server without involving another server, as the current server can access each relevant piece of information. In this case, the current server may determine a previous set. The previous set contains each area of interest which is contained in the first dataset and in which the previous location is contained in. The set Exited may be determined by subtracting the current set from the previous set:

Exited=Previous−Current:={x∈Previous|x∉Current}

This means that the set Exited contains each area of interest of the previous set which is not contained in the current set. As can be seen, this step of determining the set Exited can also be performed by the current server, due to the particular dataset structure.

According to a second option, the previous location does not fall on the current tile. Although the current server can determine the set Entered without involving another server, the current server cannot determine the set Exited for sure. However due to the used data set structure, the set Exited can be determined similarly to the set Entered without involving another server. In this case a previous tile may be determined, i.e. the tile which contains the previous location. Using the consistent hashing function, a previous server associated with the previous tile may be determined. The previous location and the current location or the previous location and the current set may be transmitted from the current server to the previous server. Using the previous location, the previous server may determine a previous set which contains each area of interest in which the previous location is contained in. Based on this previous set and the current location, the previous server can determine the set Exited. This step of determining the set Exited may be performed completely independent to the step of determining the set Entered. If both the previous server and the current server receive the location information, both servers can calculate the respective sets independently to each other. This also enables for simultaneous and independent action triggering for both sets.

The set Exited may be determined similarly to the set Entered at the current server: An area of interest of the previous set is added to the set Exited, if the current location is not contained in a part of this area of interest in the first and second datasets. I.e. the previous server accesses each area of interest of the previous set and checks, whether the current location falls into a part of this area of interest contained in the first or second datasets. If the current location is not contained in this area of interest, the area of interest is exited and can be added to the set Exited. If the current location is contained in this area of interest, the area of interest is not exited.

After the step of determining location changes, which may include the steps of determining a set Entered and/or a set Exited, the method may comprise a step of triggering a location-based action. This action may be based on the determined location change. Such actions may include advertising current promotions to nearby customers, determining the time a person stays within a certain region (e.g. within a shop, a museum or sporting facilities), or communicating advices to nearby mobile clients (e.g. a radius around the accident would be a area of interest and cars are the mobile clients or an area of interest is created around a construction area and nearby citizens may receive advices).

The system according to an embodiment of the invention provides according means which enables the system to perform the steps of the method for providing location-based services to a mobile client. Preferably, the system may additionally comprise means for determining a previous tile, wherein said previous tile is one of said plurality of tiles and contains said previous location, means for determining a server associated with said previous tile using said consistent hashing function, and means for calculating location changes (areas exited) of said client using said previous location and said current location based on said first and second datasets At the system according to an embodiment of the invention, flexibility of the system may be even further increased by organizing the servers in a ring. This does not necessarily mean that the topology of the network connecting the servers has to be a ring. However, the logical structure of the servers is a ring. The advantage of this kind of organization becomes clear, when looking at adding a server to the ring or removing of a server from the ring.

At adding a new server to the ring, several tiles which are associated to one or both neighboring server may be re-assigned with the new server. By doing so, the number of tiles which have to be reshuffled can be reduced to a minimum. When re-assigning tiles from one neighboring server, half of the tiles of the neighboring server may be re-assigned to the new server. When re-assigning tiles from both neighboring servers, a third of the tiles associated with the neighboring servers may be re-assigned with the new server. Although this introduces an uneven distribution of tiles to the server, this approach is an easy way to handle hotspots, i.e. tiles which intersect highly frequented areas of interest. An uneven distribution may be considered, when single tiles are re-assigned to a new server.

At re-assigning a tile to a new server, the server which was associated to this tile before may transfer the first and second datasets for the tile to the new server. Alternatively, the first and second datasets may be recalculated as described before. Additionally, the consistent hashing function/s is/are updated so that the new association is reflected by the hashing functions.

At removing a server, the tile/s which is/are associated with the removed server has/have to be re-assigned to one or several new servers. One possibility includes adapting the consistent hashing function and re-assigning the tile anew using the adapted hashing function. An alternative approach includes re-assigning the tiles to one or both neighboring servers.

The system and the method for providing location-based services to a mobile device according to an embodiment of the invention use the previous location and the current location of the mobile device for determining location changes. There are several options, how these previous and current locations are provided. A first option comprises introducing a location tracking entity which receives regular location updates for each mobile client. The location tracking entity may delete location information, if two subsequent location updates are received for a mobile client. As soon as the location tracking entity receives a new location update for a mobile client, the location tracking entity may trigger calculation of location changes which in turn may trigger certain location-related action.

However, according to a preferred embodiment, the previous and current locations are provided by the mobile client itself. Many mobile clients provide a location cache which stores previous location information. At a location update, the mobile device may transmit the previous location and the current location to the system for providing LBS which may trigger the calculation of location changes and certain location-related action. This option reduces the number of exchanged messages even further. Furthermore, the system does not depend of shared-data layer, accessible to all servers. By shifting this problem to the client, making it sent along with the current also a previous (possibly cached locally) location, the system is stateless and does not depend on shared data, enabling distributed computations.

FIG. 1 illustrates the basic concept of the Geofencing problem. At a first location update, a mobile device is located at a previous location PL within Area1. At a second location update performed after the first location update, the mobile device is located at a current location CL within Area2. This means that the mobile device has moved from PL to CL and from Area1 to Area2. A Geofencing system would trigger Area1 as being exited and Area2 as being entered.

Figure 2:
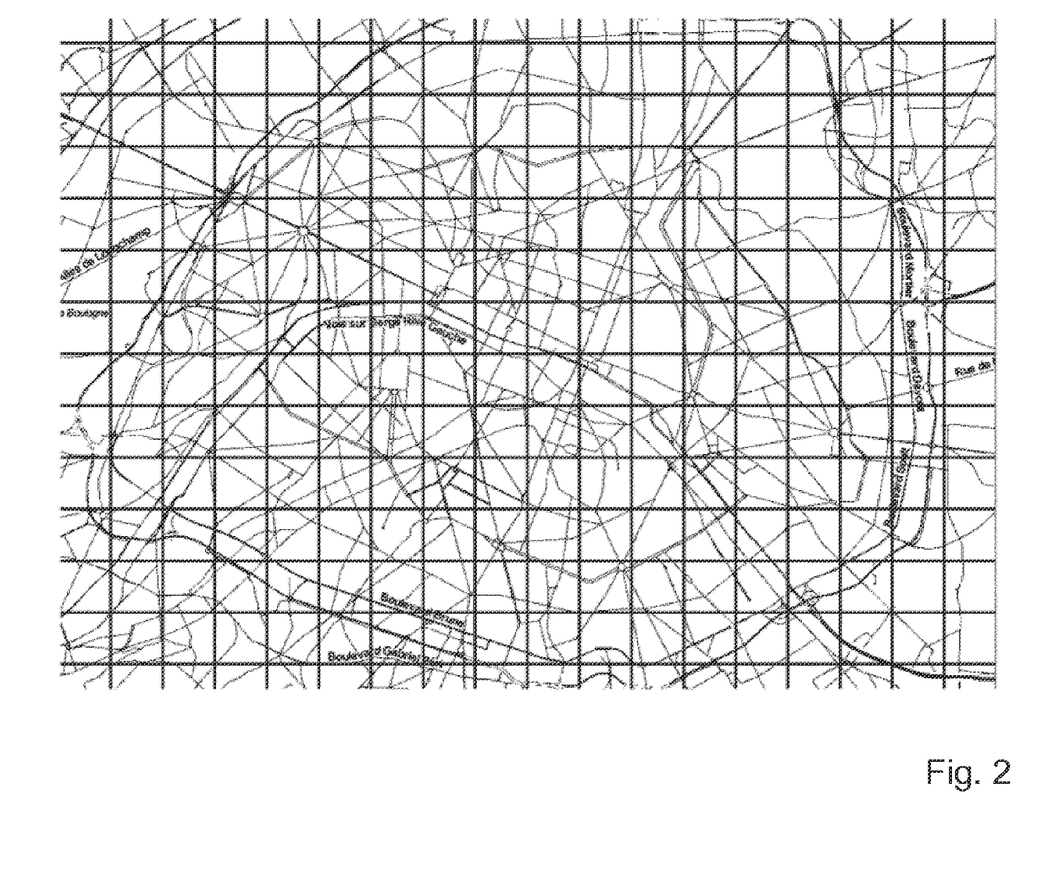
FIG. 2 shows a geographical area which is partitioned into a plurality of quadratic tiles according to an embodiment.

FIG. 2 shows a geographical area which is partitioned in equal-sized tiles. The geographic area is the center of Paris which is represented by the map shown in FIG. 2. The quadratic tiles partition the entire space into smaller chunks. The areas of interest might be defined by a part of a street, a building (such as shopping mall, museum, cinema or a conference center), a Metro station or the like.

Figure 3:
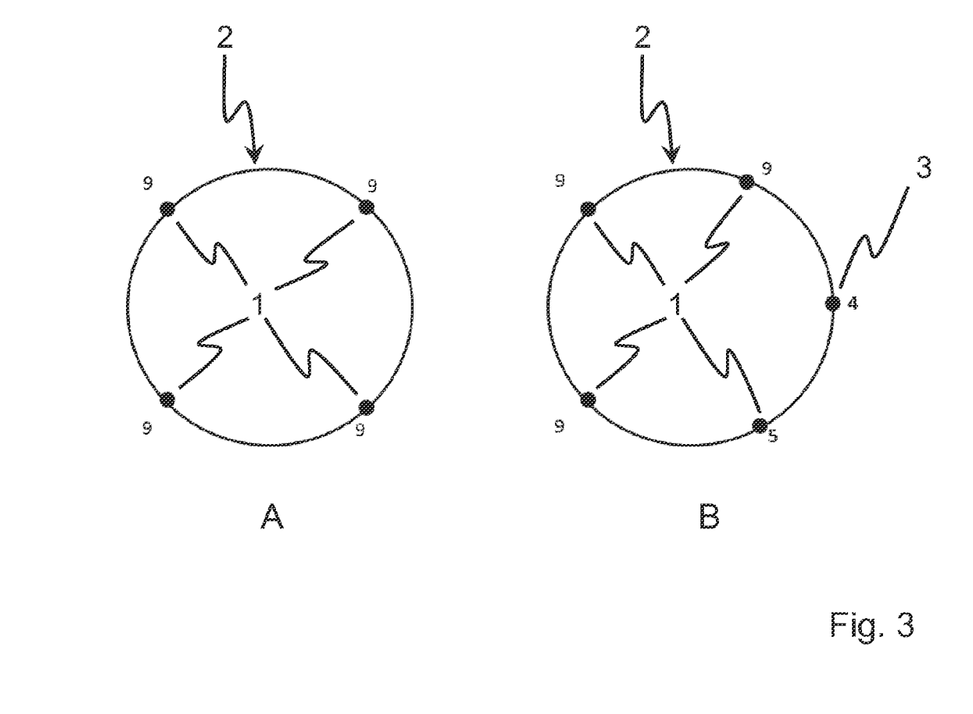
FIG. 3 shows a schematic diagram of server ring which may be used in connection with the method and system according to an embodiment.

FIG. 3A displays four servers 1 which are organized in a ring 2. These servers may be used at the system and the methods according to an embodiment of the invention. In the example of FIG. 3, a geographical area is partitioned into a 6×6 grid which results in 36 tiles. Each tile is associated with one of the four servers according to a consistent hashing function. Each server is associated with the same amount of tiles, i.e. 9 tiles.

In FIG. 3B, a new server 3 is added to the ring 2. When adding the new server 3, several of the tiles associated with one or both neighboring servers are re-assigned with the new server. In the example of FIG. 3, one server 1 gives 4 tiles to the neighboring new server 3, thus keeping 5. This translates in reshuffling 4 tiles.

Generally, when adding a server to or removing a server from the ring, in average $$C=k/n$$

tiles have to be reshuffled, where the grid comprises K tiles and the ring contains n server. In the present example, adding one server would result in reshuffling C=K/n=36/5=7.2 tiles. If only tiles from a neighbouring server are reshuffled, this number is reduced considerably. Even if tiles from both neighbouring servers are reshuffled, the number of re-associated tiles is below this average number. A neighbouring server may give one third of the associated tiles to the new server, i.e. 3 tiles are shifted from each of the neighbouring server to the new server. Thus, 6 tiles have to be reassigned.

If the system provides replicas, the average number of reshuffled tiles is $$C=R \cdot K/n$$

where R is the number of replicas, i.e. each tile is associated to R server. Also in this case, re-associating only several tiles from one or both neighboring servers to a new server reduces the number of reshuffled tiles considerably.

Figure 4:
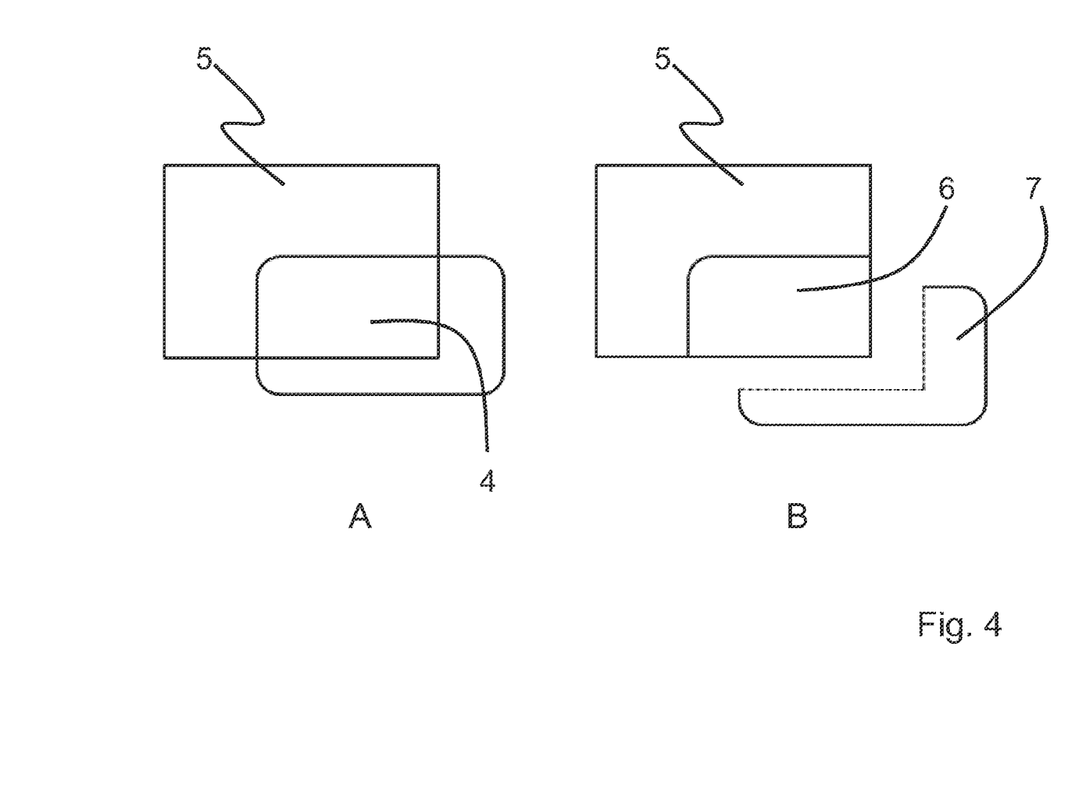
FIG. 4 shows an example of an area of interest which is trimmed by edges of a tile according to an embodiment.

FIG. 4A displays an area of interest 4 which intersects a tile 5. In the example of FIG. 4A, the area of interest 4 is trimmed by two edges of the rectangular tile 5. This divides the area of interest into a part which intersects tile 5 and a part which is located outside tile 5. In the terms of the present application, the area of interest is divided into a first part 6 which intersects tile 5 and a second part 7 which overflows tile 5. At generating the dataset structure, first and second datasets are generated, wherein the first dataset comprises each first part 6 and the second dataset comprises each second part 7. At storing the first and second datasets, the link between the first and second parts should be stored. This facilitates determination of location changes considerably.

FIG. 4B displays this separation into first and second parts more clearly.

As become apparent, area of interest 4 will intersect tile 5 as well as two neighboring tiles: one on the right hand side and one on the bottom side of tile 5. As the first and second datasets are generated for each tile, area of interest 4 will be contained in the first and second datasets which are generated for three tiles. Each dataset for each tile will comprise a different part of area of interest 4.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating a dataset structure for location-based services, comprising:
    partitioning a geographical area, including a plurality of areas of interest, into a plurality of tiles,
    associating the tiles with a plurality of servers, wherein each of the tiles is associated with at least one of the servers based on a consistent hashing function and at least two of the tiles are associated to different ones of the servers, the consistent hashing function providing at least one unique link between each of the tiles and the at least one of the servers,
    generating, for each of the tiles, a first dataset of the dataset structure including the areas of interest intersecting the tile, wherein the areas of interest of the first dataset are trimmed by edges of the tile or completely contained in the tile,
    generating, for each of the tiles, a second dataset of the dataset structure including overflowed parts, wherein each of the overflowed parts is part of one of the areas of interest of the first dataset, is trimmed by an edge of the tile and is located outside of the tile, and
    storing, for each of the tiles, the first and second datasets at the at least one of the servers associated to the tile based on the at least one unique link.

2. The method according to claim 1, wherein the areas of interest are geofences and the location-based services are provided by a geofencing system based on the first and second datasets of the dataset structure.

3. The method according to claim 1, wherein the tiles are quadratic, rectangular, hexagonal, octagonal or have another polygonal shape.

4. The method according to claim 1, wherein the consistent hashing function employs a load balancing scheme.

5. The method according to claim 1, wherein a plurality of hashing functions are used to associate a tile with two or more servers to provide replicas of elements of the first and second datasets.

6. The method according to claim 1, further comprising inserting an new area of interest to the geographical area, the inserting comprises:
    determining each tile of the plurality of tiles which intersects the new area of interest,
    mapping the new area of interest to the determined tiles, and
    adding, for each of the determined tiles, the new area of interest to the first and second datasets.

7. The method according to claim 1, wherein based on one of the servers being removed, adapting the consistent hashing function and re-assigning tiles of the removed server using the adapted hashing function.

8. A method for providing location-based services to a mobile client within a geographical area, based on a dataset structure generated at a plurality of servers, wherein the geographical area comprises a plurality of areas of interest and is partitioned into a plurality of tiles, wherein the dataset structure includes a first dataset including the areas of interest intersecting each tile, wherein the areas of interest of the first dataset are trimmed by edges of each tile or completely contained in each tile, and a second dataset of the dataset structure including overflowed parts, wherein each of the overflowed parts is part of one of the areas of interest of the first dataset, is trimmed by an edge of the tile and is located outside of the tile, comprising:
    receiving location information of the mobile client, wherein the location information comprises a previous location and a current location of the mobile client determined at two consecutive location updates,
    determining a current tile, wherein the current tile is one of the plurality of tiles and contains the current location,
    determining a current server associated with the current tile based on a consistent hashing function, the consistent hashing function providing at least one unique link between each tile of the plurality of tiles and at least one of the plurality of servers, wherein at least two of the tiles are associated to different ones of the servers and wherein the current server is one of the plurality of servers, accessing, at the current server, the first and second datasets of the dataset structure based on the at least one unique link,
determining, by the current server, a current set of areas of interest, wherein the current set comprises each of the areas of interest of the first dataset which contain the current location, and
determining location changes based on the current set and the previous location.

9. The method according to claim 8, wherein the determining location changes includes determining a set Entered, wherein the set Entered comprises each of the areas of interest which is entered by the mobile client moving from the previous location to the current location, wherein the determining the set Entered comprises:
adding one of the areas of interest of the current set to the set Entered based on the previous location not being contained in an area of interest of the first or second datasets.

10. The method according to claim 8, wherein the determining location changes includes determining a set Exited, wherein the set Exited comprises each of the areas of interest which is exited by the mobile client moving from the previous location to the current location.

11. The method according to claim 10, wherein, based on the previous location falling on the current tile, the determining the set Exited is performed by the current server, comprising:
determining a previous set of areas of interest, wherein the previous set comprises each of the areas of interest of the first dataset which contain the previous location, and
calculating the set Exited by subtracting the current set from the previous set, wherein the set Exited contains each area of interest of the previous set which is not contained in the current set.

12. The method according to claim 10, wherein the previous location does not fall on the current tile, and the determining the set Exited comprises:
determining a previous tile, wherein the previous tile is one of the plurality of tiles and contains the previous location,
determining, based on the consistent hashing function, a previous server associated with the previous tile,
receiving the previous location and the current location at the previous server,
accessing, at the previous server, the first and second datasets of the dataset structure,
determining, by the previous server, a previous set of areas of interest, wherein the previous set comprises each of the areas of interest of the first dataset which contain the previous location, and determining the set Exited based on the previous set.

13. The method according to claim 12, wherein the determining the set Exited comprises:
adding one of the areas of interest of the previous set to the set Exited, based on the current location not being contained in a part of the area of interest contained in the first or second datasets stored at the previous server.

14. The method according to claim 8, wherein the method further comprises triggering a location-related action based on the determined location changes.

15. A system for providing location-based services to a mobile client within a geographical area, based on a dataset structure generated, wherein the geographical area comprises a plurality of areas of interest and is partitioned into a plurality of tiles, wherein the dataset structure includes a first dataset including the areas of interest intersecting each tile, wherein the areas of interest of the first dataset are trimmed by edges of each tile or completely contained in each tile, and a second dataset of the dataset structure including overflowed parts, wherein each of the overflowed parts is part of one of the areas of interest of the first dataset, is trimmed by an edge of the tile and is located outside of the tile, the system comprising:
a plurality of servers, wherein each of the servers is associated with at least one tile of the plurality of tiles based on a consistent hashing function and at least two of the tiles are associated to different ones of the servers, and
one or more hardware processors, which alone or in combination, are configured to provide for execution of the following steps:
receiving location information of the mobile client, wherein the location information comprises a previous location and a current location of the mobile client determined at two consecutive location updates,
determining a current tile, wherein the current tile is one of the plurality of tiles and contains the current location,
determining, based on the consistent hashing function, a server associated with the current tile, the consistent hashing function providing at least one unique link between each tile of the plurality of tiles and at least one of the plurality of servers, and
determining location changes of the mobile client according to the previous location and the current location based on the first and second datasets and the at least one unique link.

16. The system according to claim 15, wherein the one or more hardware processors are further configured to provide for execution of the following steps:
determining a previous tile, wherein the previous tile is one of the plurality of tiles and contains the previous location,
determining one of the servers associated with the previous tile based on the consistent hashing function, and
calculating location changes of the mobile client according to the previous location and the current location based on the first and second datasets.

17. The system according to claim 15, wherein the servers are organized in a ring.

18. The system according to claim 17, wherein the servers are configured such that, at adding a new server to the ring, several of the tiles associated with one or both neighboring servers are re-assigned with the new server.

19. The system according to claim 15, wherein, based on one of the servers being removed, one or more of the tiles associated with the removed server is associated, based on the consistent hashing function, with at least one of the other servers.

20. The system according to claim 15, wherein the previous location and the current location are transmitted to the one or more hardware processors by the mobile client.

* * * * *